US009547949B2

(12) United States Patent
Holl

(10) Patent No.: US 9,547,949 B2
(45) Date of Patent: Jan. 17, 2017

(54) METHOD AND DEVICE FOR EXAMINING THE OPTICAL STATE OF VALUE DOCUMENTS

(75) Inventor: Norbert Holl, Germering (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 235 days.

(21) Appl. No.: 13/995,372

(22) PCT Filed: Dec. 20, 2011

(86) PCT No.: PCT/EP2011/006452
§ 371 (c)(1),
(2), (4) Date: Jun. 18, 2013

(87) PCT Pub. No.: WO2012/084210
PCT Pub. Date: Jun. 28, 2012

(65) Prior Publication Data

US 2013/0272598 A1 Oct. 17, 2013

(30) Foreign Application Priority Data

Dec. 21, 2010 (DE) ........................ 10 2010 055 427

(51) Int. Cl.
*G06K 9/00* (2006.01)
*G07D 7/12* (2016.01)
(Continued)

(52) U.S. Cl.
CPC ............ *G07D 7/124* (2013.01); *G07D 7/0066* (2013.01); *G07D 7/2008* (2013.01)

(58) Field of Classification Search
CPC ...................................................... G07D 7/124
See application file for complete search history.

(56) References Cited

U.S. PATENT DOCUMENTS 6,343,204 B1 1/2002 Yang
7,995,196 B1 * 8/2011 Fraser ................ G06K 9/00577 356/71
(Continued)

FOREIGN PATENT DOCUMENTS

DE 103 35 660 A1 3/2005
DE 10 2006 053 209 A1 5/2007
(Continued)

OTHER PUBLICATIONS

Hassanpour. "Using Hidden Markov Models for Feature Extraction in Paper Currency Recognition" DOI: 10.1016/j.eswa. Expert Systems with Applications, Aug. 2009.*
(Continued)

*Primary Examiner* — Oneal R Mistry
(74) *Attorney, Agent, or Firm* — Workman Nydegger

(57) ABSTRACT

A method for examining the optical condition of a value document on the basis of a digital image of at least a specified region of the value document, the image comprising pixels, comprises searching the pixels of the digital image are searched for sets of error pixels which are respectively given in that the error pixels fulfill a specified deviation criterion for an impermissible deviation of at least one specified pixel property, and the distance of each error pixel of the respective set from at least one other error pixel of the same set does not exceed a specified distance that is greater than the distance of directly neighboring pixels of the digital image, and a number of sets found during the search and/or a value for at least one property of at least one of the sets found during the search is ascertained.

17 Claims, 7 Drawing Sheets

(51) Int. Cl.
*G07D 7/00* (2016.01)
*G07D 7/20* (2016.01)

(56) References Cited

U.S. PATENT DOCUMENTS

| | | | | |
|---|---|---|---|---|
| 8,139,273 | B2 * | 3/2012 | Nishikawa | 358/474 |
| 8,162,125 | B1 * | 4/2012 | Csulits et al. | 194/206 |
| 2003/0081826 | A1 * | 5/2003 | Karin | G06T 1/0007 382/151 |
| 2005/0100204 | A1 | 5/2005 | Afzal et al. | |
| 2007/0154078 | A1 * | 7/2007 | He et al. | 382/135 |
| 2007/0177787 | A1 * | 8/2007 | Maeda | G06T 7/001 382/141 |
| 2009/0245590 | A1 | 10/2009 | Holl et al. | |
| 2010/0220364 | A1 * | 9/2010 | Picard | G03G 21/046 358/3.28 |

FOREIGN PATENT DOCUMENTS

| | | | |
|---|---|---|---|
| DE | 10 2006 053 788 | A1 | 5/2008 |
| WO | 00/26861 | A1 | 5/2000 |
| WO | 02/075673 | A1 | 9/2002 |
| WO | WO 02075673 | A1 * | 9/2002 |

OTHER PUBLICATIONS

Langenbach, Ralf, "Methoden der Farbbildverarbeitung fur die automatische Oberflacheninspektion" pp. 45-50, 179-212 (2002).
Lucht, C. et al.; "Qualitatskontrolle von bedruckter, textiler Bahnenware—ausgewahlte Losungsverfahren zur Farbmusterinspektion" pp. 1-10 (2011).
International Search Report in PCT/EP2011/006452, Feb. 17, 2012.
Search Report in German Patent Application No. 10 2010 055 427.8, Jul. 29, 2011.

* cited by examiner

METHOD AND DEVICE FOR EXAMINING THE OPTICAL STATE OF VALUE DOCUMENTS

FIELD OF INVENTION

The present invention relates to a method for examining the optical condition of value documents, to an evaluation device for carrying out said method, and to an apparatus for carrying out said method.

BACKGROUND

Value documents are understood here to be sheet-shaped objects that represent for example a monetary value or an authorization and hence should not be producible arbitrarily by unauthorized persons. Hence, they have features that are not simple to produce, in particular to copy, whose presence is an indication of authenticity, i.e. manufacture by an authorized body. Important examples of such value documents are chip cards, coupons, vouchers, checks and in particular bank notes.

Value documents often have an optical design specific to the respective type of the value documents, i.e. a specific appearance, which can, but does not have to, additionally comprise security features. The optical design can be given for example by a printed image on the value document. The printed image here can be a printed image in the range of the optical radiation or the optical wavelength range, which will hereinafter be understood to be infrared radiation, ultraviolet radiation and radiation in the visible wavelength range.

For a given value document, the optical design, in particular the printed image, can deviate from the specified design, for example because the value document has been soiled through use or tampering. The nature and extent of the deviations in the optical design substantially determine the optical condition of a value document, which in turn constitutes an essential aspect of the overall condition of a value document. The condition of the value document can determine in particular whether or not a value document can still be employed as such, i.e. is fit for circulation. With respect to the optical condition, the deviations, in particular in the printed image, can for example, depending on their nature and extent, impair or even exclude the recognition of the value or authenticity of a value document. Hence, it is important to be able to examine and rate the condition of a value document by machine if possible. In view of the many possibilities for a deviation of the optical design from the specified design, it is desirable to know methods for examining the optical condition of value documents that enable a differentiated rating.

SUMMARY OF THE INVENTION

The present invention is hence based on the object of providing a method for examining the condition of a value document that enables good informative power, as well as of providing means for carrying out the method.

This object is achieved by a method for examining the optical condition of a value document on the basis of a digital image of at least a specified region of the value document, the digital image comprising pixels, there being searched in the pixels of the digital image for sets of error pixels which are respectively given in that the error pixels fulfill a specified deviation criterion for an impermissible deviation of at least one specified pixel property, and the distance of each error pixel of the respective set from at least one other error pixel of the same set does not exceed a specified distance that is greater than the distance of directly neighboring pixels of the digital image, and a number of sets found during the search and/or a value for at least one property of at least one of the sets found during the search is ascertained. There can then be emitted a signal representing the number or value, and/or the number or value can be stored in a storage device.

The object is further achieved by an evaluation device for examining the optical condition of a value document on the basis of a digital image of at least a specified region of the value document, the digital image comprising pixels, wherein the evaluation apparatus has an interface for receiving a digital image of at least a specified region of the value document and is configured for carrying out a method according to the invention on the basis of the digital image of at least a specified region of the value document that is received by means of the interface. In particular, the evaluation device is configured for searching in the pixels of the digital image received by means of the interface for sets of error pixels which are respectively given in that the error pixels fulfill a specified deviation criterion for an impermissible deviation of at least one specified pixel property, and the distance of each error pixel of the respective set from at least one other error pixel of the same set does not exceed a specified distance that is greater than the distance of directly neighboring pixels of the digital image, and for ascertaining a number of sets found during the search and/or a value for at least one property of at least one of the sets found during the search. Further, it can be configured for then emitting a signal representing the number or value, and/or for storing the number or value.

The object is further achieved by an apparatus for examining the optical condition of a value document, having an optical sensor for capturing a digital image of at least a region of the value document, and an evaluation device according to the invention whose interface is connected to the sensor via a signal connection, so that a digital image captured by the sensor is receivable by the evaluation device.

A further subject matter of the invention is a method for examining the optical condition of a value document wherein a digital image of at least a specified region of the value document is captured by means of an optical sensor, the digital image comprising pixels, and the above-mentioned method according to the invention is carried out with the digital image.

The starting point of the stated solution are thus digital images of at least a specified region of a value document. The region can be suitably specified in a fundamentally arbitrary way, for example it can comprise the total value document or only regions specified as relevant for assessing the condition. In the latter case, the region can be specified specifically for each type of value document, in the case of bank notes in particular for each denomination or face value.

The digital image is captured with an optical sensor which captures properties, specified in a locally resolved manner, of optical radiation emanating from the value document, which radiation is filtered through the sensor, where applicable, there being generated signals representing the captured property in association with the locations or image points. The digital image comprises, in the known way, pixels which respectively correspond to a value-document image point dilated in accordance with the resolution of the optical sensor employed for capture, and having associated therewith pixel data which render properties of the pixels, in particular properties of the optical radiation emanating from the respective image point, and thus, at a given illumination, optical properties of the region of the value document. The digital image of the sensor can, but does not have to, be preprocessed in particular before being employed for the method, for example there can be carried out corrections of the properties of the image, for example of colors, or a filtering, in particular a low-pass filtering, for example by averaging over a pixel and its nearest neighboring pixels. This can be done by a corresponding device of the sensor or by the evaluation device. The resulting digital image is then employed for carrying out the method.

For further processing the digital image there can be employed the evaluation device which has the interface for receiving the digital image and is configured for carrying out the method according to the invention with the digital image received by means of the interface. The interface can comprise hardware components and/or software components. For further processing of the digital image there can be employed a computer having at least one processor which can in particular be part of the evaluation apparatus. A processor is understood here to be a suitable controller, an FPGA, a signal processor or a multipurpose processor or a combination of at least two of said elements. If a preprogrammed FPGA is not employed alone, there can be provided a memory connected to the at least one processor, being integrated therein, where applicable, which stores instructions of a computer program upon whose execution the method according to the invention is executed.

In the digital region, sets of error pixels are searched for by means of the processor among the pixels of the digital image. Error pixels are those pixels of the digital image that fulfill the specified deviation criterion, which establishes when a deviation of the at least one specified pixel property from a specified value is to be regarded as impermissible.

The deviation criterion can be given for example by checking whether the pixel data for one pixel or several pixels of a specified evaluation region deviate according to a specified criterion from a reference distribution for permissible pixel data that is specified for the pixel or pixels in dependence on the value-document type, for example whether they lie outside said reference distribution. An example of such a procedure for ascertaining the deviation or for checking the deviation criterion is a method as described in WO 2008/058742 A1, whose total content is hereby incorporated in the description by reference. It is also possible to compare the digital image with a reference image for the value-document type and, after an alignment of the images with each other, to ascertain the deviations of the pixel data of the digital image and of the reference image pixel by pixel and to check a specified criterion for a maximum permissible deviation. In the case of color images, the deviation can be given for example by a distance or a square of a distance.

The sets of error pixels are characterized in that the distance of each error pixel of the respective set from at least one other error pixel of the same set does not exceed a specified distance that is greater than the distance of directly neighboring pixels of the digital image. Directly neighboring pixels are understood here to be pixels that touch each other at least at one point; in the case of pixels arranged on a square grid, the eight pixels nearest to a given pixel are thus the directly neighboring pixels thereof. The distance of two pixels is understood here to be the distance of the geometric centroids of the pixels. Due to this property of the sets, an error pixel can only belong to a single set or, put in different terms, only be associated with this single set. Further, the error pixels of a set do not necessarily form a contiguous domain in the image, but rather can be given by near neighboring domains. The choice of the specified distance establishes how far apart the domains may be from each other to belong to the same set. Preferably, the distance lies between 2 and 10, preferably 3 and 6, expressed in units of the smallest distance of directly neighboring pixels. Depending on the optical condition of the value document, the deviation criterion and the specified distance, there can be found during the search no sets, only one set or also several sets.

Then the number of the sets found during the search is ascertained, and/or a value of at least one property of at least one of the sets found during the search is ascertained. In this way a differentiated statement about the optical condition of the value document is possible. In particular, it is easy to capture for example irregularly distributed spots, for example sprayed on drops. Also, pixel errors possibly occurring with sensors of very high local resolution have less effect during the examination of condition.

In dependence on the result of the ascertainment, or the results of the ascertainment, a signal representing them can be emitted, or a corresponding value can be stored, which can be effected in the memory or another storage device.

The results, i.e. the number and/or value, can be employed either alone for characterizing the overall condition, or be employed for ascertaining an overall condition that includes further parameters as well.

The search for the sets of error pixels can be effected in different ways. According to a preferred alternative, in the method, for searching for a set of error pixels, error pixels can be associated with the set such that for an error pixel already associated with the set there is searched for a nearest error pixel that fulfills the deviation criterion and that is not yet associated with the set and whose distance from the already associated pixel does not exceed the specified distance, and when such a nearest error pixel is found it is associated with the set. For this purpose, the evaluation device can be so configured that, for searching for a set of error pixels, error pixels are associated with the set such that for an error pixel already associated with the set there is searched for a nearest error pixel that fulfills the deviation criterion and that is not yet associated with the set and whose distance from the already associated pixel does not exceed the specified distance, and when such a nearest error pixel is found it is associated with the set. An advantage of this procedure is that it allows the searched for sets to be found fast.

In particular, in this execution of the method, the search for the nearest error pixel and its associating can be executed repeatedly during the search for a set, respectively employing as the error pixel already associated with the set the error pixel last associated with the set. The evaluation device is then configured for executing the search for the nearest error pixel and its associating repeatedly during the search for a set, respectively employing as the error pixel already associated with the set the error pixel last associated with the set. This procedure offers the advantage that the sets can be ascertained simply and fast.

In so doing, the error pixels can be searched for in a fundamentally arbitrary way. However, in the method, it is preferred that for searching for the nearest error pixel an error pixel is respectively searched for in a search list of pixels which is determined at least by the error pixel last associated with the set and the specified distance or by the error pixel last associated with the set and a specified list. The evaluation device can for this purpose preferably be configured such that for searching for the nearest error pixel an error pixel is respectively searched for in a search list of pixels which is determined at least by the error pixel last associated with the set and the specified distance or by the error pixel last associated with the set and a specified list. This embodiment offers the advantage that a list of pixels only needs to be searched, but no computation of distance is required. Preferably, the search list and/or the specified list is so determined in dependence on the specified distance that it contains all pixels or only all pixels fulfilling the deviation criterion within the specified distance, depending on the embodiment. The search list needs to be run through only until an error pixel is found. The search list can in particular be determined by the specified list only stating the position relative to a pixel, and the search list being determined by conversion of the specified list to the position of the last associated error pixel.

Further it is preferred, in the method, that for searching for the nearest error pixel, error pixels are searched for along a pick ray starting out from the error pixel last associated with the set and rotated stepwise in a specified rotation direction. The evaluation device is then preferably configured such that for searching for the nearest error pixel, error pixels are searched for along a pick ray starting at the error pixel last associated with the set and rotated stepwise in a specified rotation direction. The pick ray here is an imaginary path in a plane in which pixels are arranged; it begins in the error pixel last associated with the set or starts out from there, for example its geometric centroid, and can preferably have the length of the specified distance. At the beginning the pick ray can have an arbitrarily specified initial direction, for example along one of the rows if the pixels are arranged in a square matrix. During the search between the rotations there can be searched either always in the order of increasing distance from the last associated error pixel, or always in the order of decreasing distance from the last associated error pixel, or alternately in the order of increasing distance and decreasing distance. This method allows error pixels to be found and associated with a set in an especially efficient way, because even in unfavorable constellations there are only few distances to be ascertained. Further, this kind of search covers all pixels whose distance from the last associated error pixel does not exceed the specified distance.

If a search list is employed for the search, it can be so chosen that the pixels are searched in the order corresponding to the order described in the last paragraph.

The method according to the invention includes the check of the deviation criterion, on the one hand, and the check of whether the distance of two error pixels undershoots the specified distance, on the other hand. These checks can be carried out in a basically arbitrary way. Thus, in the method, during the search for the sets the pixels fulfilling the deviation criterion can preferably first be ascertained, and thereafter these pixels can be associated with the sets as error pixels. The evaluation device can then further be so configured that during the search of the sets those pixels fulfilling the deviation criterion are first ascertained, and thereafter these pixels can be associated with the sets as error pixels. This method is advantageous in particular when the check of the deviation criterion can be carried out fast in comparison to the check for the distance of two pixels.

In another preferred embodiment, however, it can also be provided that, in the method, during the search for the sets, starting out from an error pixel of a set, pixels whose distance from the error pixel does not exceed the specified distance are checked as to whether they fulfill the deviation criterion. The evaluation device can for this purpose preferably further be so configured that during the search for the sets, starting out from an error pixel of a set, pixels whose distance from the error pixel does not exceed the specified distance are checked as to whether they fulfill the deviation criterion. This procedure is advantageous, inter alia, when the checking of the deviation criterion is not very fast.

A further advantage of the embodiment is that the following preferred development can be simply realized. It provides that, in the method, the deviation criterion depends on the distance between the error pixel and the currently checked pixel. The evaluation device is then so configured that the deviation criterion depends on the distance between the error pixel and the currently checked pixel.

In another embodiment of the method, it is preferred that for searching for a set of error pixels there are first searched for groups of error pixels that respectively comprise error pixels that fulfill the deviation criterion and that are directly neighboring, that, in the method, it is checked whether the distance of at least one error pixel of one of the groups from at least one error pixel of another of the groups whose error pixels are not yet associated with a set does not exceed the specified distance and, if this is the case, the error pixels of the two groups are associated with the same set. For this purpose, the evaluation device can preferably further be configured such that for searching for a set of error pixels there are first searched for groups of error pixels that respectively comprise error pixels that fulfill the deviation criterion and that are directly neighboring, that, in the method, it is checked whether the distance of at least one error pixel of one of the groups from at least one error pixel of another of the groups whose error pixels are not yet associated with a set does not exceed the specified distance and, if this is the case, the error pixels of the two groups are associated with the same set. This embodiment is suited in particular for cases in which large groups of directly neighboring error pixels are present. In particular, it is also preferred in this embodiment that, in the method, during the search for the sets the pixels fulfilling the deviation criterion are first ascertained, and thereafter these pixels are first associated with the groups as error pixels. This procedure can considerably speed up the ascertainment of the groups.

In the method according to the invention, the ascertained number and/or the ascertained value for at least one property of at least one of the sets found during the search can preferably be employed for ascertaining a value representing the optical condition. The evaluation device can then preferably be configured for ascertaining a value representing the optical condition while employing the ascertained number and/or the ascertained value for at least one property of at least one of the sets found during the search.

As properties of the set there can be employed for example of the set its number of error pixels. For this purpose the evaluation device can be configured accordingly.

It is preferred, however, that alternatively or additionally, in the method, there is employed as a property of the set a function of the number of error pixels of the set and of the length of a line through the error pixels of the set which form the edge thereof. The evaluation device can then further be configured for employing as a property of the set a function of the number of error pixels of the set and of the length of a line through the error pixels of the set which form the edge thereof In a method for sorting value documents, the method according to the invention can be executed for each value document to be sorted, the value document being transported, in dependence on the ascertained optical condition, preferably in dependence on an overall condition ascertained while employing the optical condition, into a receiving means provided for the ascertained optical condition or overall condition. The subject matter of the invention is hence also an apparatus for processing, in particular sorting, value documents, having an apparatus according to the invention for examining value documents and a transport device for transporting singled value documents past the examination apparatus, which is configured for transporting value documents, in dependence on signals of the examination apparatus, in dependence on the optical condition, preferably an overall condition ascertained in dependence on the optical condition, into a receiving means of the apparatus that is provided for value documents of a specified optical condition or overall condition.

The subject matter of the invention is further a computer-readable data carrier with program code which is executable by a computer, so that the computer executes a method according to the invention.

BRIEF DESCRIPTION OF THE DRAWINGS

The invention will hereinafter be explained further by way of example with reference to the drawings. There are shown.

DETAILED DESCRIPTION OF EMBODIMENTS OF THE INVENTION

Figure 1:
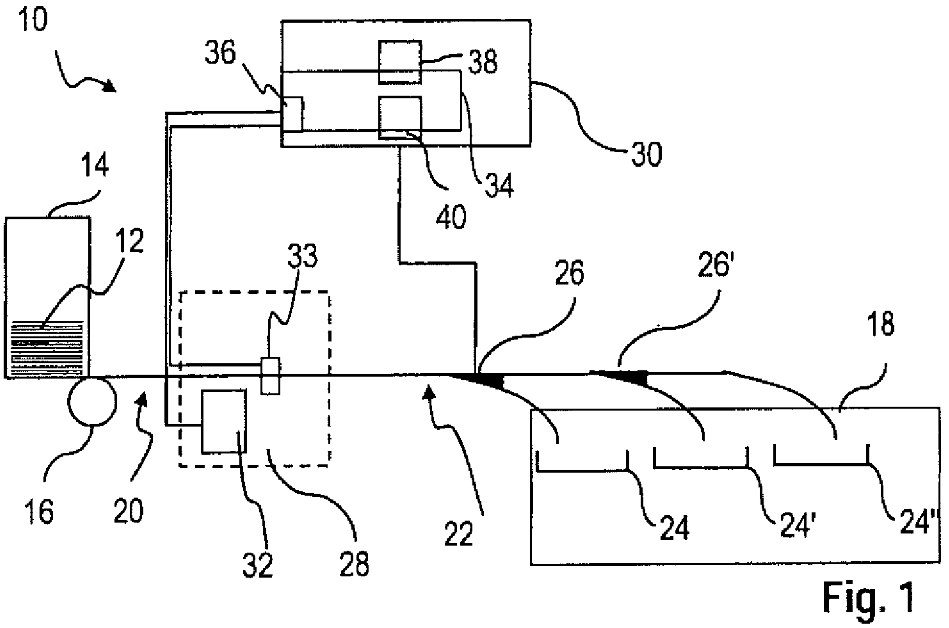
FIG. 1 a schematic representation of a value-document processing apparatus in the form of a bank-note sorting apparatus, FIGS. 2*a, b* schematic representations of an optical sensor of the apparatus in FIG. 1 in the transport direction of a value document and in the viewing direction onto a transport plane in which value documents are transported past it, FIG. 3 a schematic representation of a digital image of a value document and of some pixels of the image, FIG. 4 a flowchart for a first method for examining a condition of a value document by means of the apparatus in FIG. 1, FIG. 5 a flowchart for a search for sets of error pixels in a step S14 of the method in FIG. 4, FIG. 6 a schematic representation of a part of a digital image to illustrate an order during the search for error pixels, FIG. 7 a schematic representation of the part of the digital image in FIG. 6 with a search path, FIGS. 8*a, b* value documents with different soilings, FIG. 9 a flowchart for a search for sets of error pixels in a step S14' of a second method for examining a condition of a value document by means of the apparatus in FIG. 1, and FIGS. 10*a, b* a flowchart for a search for sets of error pixels in a step S14" of a fourth method for examining a condition of a value document by means of the apparatus in FIG. 1.

An apparatus 10 for processing value documents 12, in the example a bank-note processing apparatus, in FIG. 1 serves, inter alia, for checking the authenticity and overall condition of value documents 12 in the form of bank notes and for sorting in dependence on the result of the authenticity and overall-condition check. The apparatus 10 has an input region 14, in the example an input pocket, for inputting value documents 12 to be processed, a singler 16 which can access value documents 12 in the input pocket 14 for singling them, and a transport device 20, leading to an output device 18, for transporting value documents singled by the singler 16 along a transport path 22 to the output device 18. The output device 18 has at least two, in this example three, output regions 24, 24' and 24", in the example stack pockets; for selective transport into the output regions the transport device 20 comprises gates arranged successively along the transport path 22, in the example two gates 26 and 26', so that value documents are selectively feedable to one of the output regions by control of the gates. Along the transport path 22 given by the transport device 18 there is arranged, after the singler 16 and before the gates, a sensor assembly 28 which serves for capturing properties of value documents 12 fed in singled form and forming sensor signals rendering said properties. A control device 30 is connected at least to the sensor assembly 28 and the gates 26 and 26' via signal connections and serves for evaluating sensor signals of the sensor assembly 28, in particular for checking the authenticity and condition of value documents, and for controlling at least the gates 26 and 26' in dependence on the result of the evaluation of the sensor signals, i.e. in particular the results of the check for authenticity and condition.

The sensor assembly 24 comprises at least one sensor; in this embodiment there is provided an optical sensor 32 for locally resolved capture of color properties and IR properties, which captures optical radiation remitted by the value document. Further, the sensor assembly 28 in this embodiment has a basically optional further sensor 33 for capturing ultrasonic properties of a value document transported past it.

The sensor 33 serves for checking a value document as to whether an adhesive strip is recognizable thereon. For each value document it captures, the sensor 33 emits to the control device 30 a signal that represents whether or not an adhesive strip was recognized.

While a value document is being transported past, the optical sensor 32 captures a total digital image of the value document in four spectral regions in accordance with the three color channels, red, green and blue, and in the infrared spectral region (IR channel), which image is represented by corresponding sensor signals.

The total digital image captured by the optical sensor 32 comprises pixels whose properties are given by pixel data which are relevant for the check of the bank notes with regard to their optical condition and authenticity.

For evaluating the sensor signals, the control device 30 has an evaluation device 34, which in this example is integrated into the control device 30, but can also be part of the sensor assembly 28 itself in other embodiments.

The control device 30 has, besides corresponding interfaces 36 for the sensor 32 for receiving the digital image captured thereby and the sensor 33, a processor 38 connected to the interfaces 34, and a memory 40 connected to the processor 38, which stores at least one computer program with program code upon whose execution the processor 38 in a first function as part of the evaluation device 34 evaluates the sensor signals, in particular for checking the authenticity and ascertaining an optical condition and on the basis thereof an overall condition of a checked value document, and in so doing executes, inter alia, a hereinafter described method while employing the sensor signals or the pixel data. The evaluation device 34 also includes the interfaces 36. In a second function the processor controls the apparatus or, in accordance with the evaluation, the transport device 20. The evaluation device 34 hence forms a computer within the meaning of the present invention.

During operation, the evaluation device 34 checks for each value document captured by the sensor assembly 28 at least one specified criterion for the authenticity of the value document by means of the processor 38 on the basis of the digital image of the value document. Further, the evaluation device 34 examines the optical condition of the value document on the basis of the digital image, and ascertains a condition value representing the optical condition of the value document. The evaluation device 34 then employs the condition value and the signal of the ultrasonic sensor 33 for ascertaining, according to a specified criterion, an overall-condition value representing an overall condition of the value document.

In dependence on the ascertained authenticity and the overall-condition value, the control device 30, in particular the processor 38 therein, controls the transport device 20, more precisely the gates, such that the checked value document is transported to be deposited in corresponding output regions in accordance with its ascertained authenticity and its overall condition. For example, value documents recognized as non-authentic can be output to the region 24, value documents recognized as authentic and having an overall condition suitable for further use (being "fit for circulation") to the region 24", and the value documents recognized as authentic but not having an overall condition suitable for further use to the region 24".

For processing value documents 12, value documents 12 inserted into the input pocket 14 as a stack or individually are singled by the singler 16 and fed in singled form to the transport device 18, which feeds the singled value documents 12 to the sensor assembly 24. The latter captures optical properties of the value documents 12, in the example the color image with an additional IR channel, and forms a digital image whose pixels render the corresponding properties of the value document. Further, it captures the ultrasonic properties. The control device 30 captures the sensor signals, ascertains in dependence thereon a condition and the authenticity of the respective value document, and controls the gates in dependence on the result such that the examined value documents are fed to the output pockets in accordance with their ascertained authenticity.

The optical sensor 32 is configured for capturing images for three colors and IR radiation.

Figure 2A:
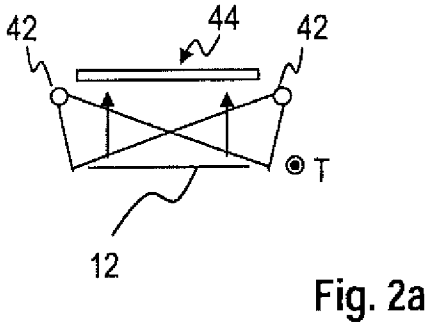
Figure 2B:
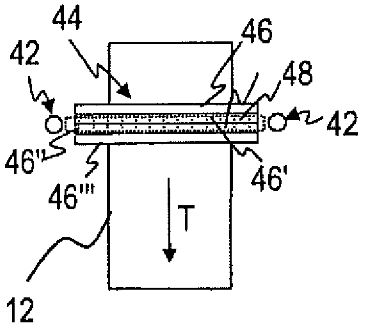

In the example, it is configured as a line sensor which, during the transport of a value document past the sensor 32, captures a sequence of line images which yield a line image of the value document in a direction transverse to the direction of the line. It comprises in the present example, schematically represented in FIGS. 2*a* and 2*b* only in extremely simplified form, an illumination device 42 for illuminating a strip, extending transversely to the transport direction T, in a transport plane E (in FIG. 2*b* parallel to the drawing plane) for the value document 12 or in a plane of the value document 12 with convergent, white light, while the value document is being transported past, over its total extension transverse to the transport direction T. In the example the illumination device 42 two has sources for optical radiation.

Further, the sensor 32 comprises a capture device 44 arranged in the ray bundle emitted by the illumination device 42. As a capture device 44 there serve in the example four line-scan cameras 46, 46', 46", 46'" with red, green and blue filters (not shown) arranged in the ray path therebefore for capturing red, green and blue fractions of the optical radiation of the illumination device 38 that is remitted by the value document. Each of the line-scan cameras has a respective detector row with photodetection elements 48 in row-type arrangement before which there is respectively arranged the filter corresponding to that color fraction of the remitted optical radiation that is to be detected by the respective line-scan camera. The sensor 32 can also comprise further optical elements, in particular for imaging or focusing, which are not shown here. The detector rows of photodetection elements are arranged parallel to each other. Furthermore, the sensor 32 comprises a signal processing device not shown in the figures, which generates a digital image from the signals of the photodetection elements.

For capturing a color image of a value document 12, the latter is transported at constant speed past the sensor 32 in transport direction T, with intensity data being captured in a locally and color-resolved manner with the line-scan cameras 46, 46' and 46" at constant time intervals. The intensity data constitute pixel data which describe the properties of pixels of a line image rendering the line-type region of the value document 12 which region is captured by the sensor 32. By putting the line images together in accordance with the time sequence of capture, i.e. by corresponding association of the pixel data, one then obtains a total digital image of the value document with pixels respectively having associated therewith pixel data that render or represent optical properties of the value document, namely, color values for red, green and blue.

Figure 3:
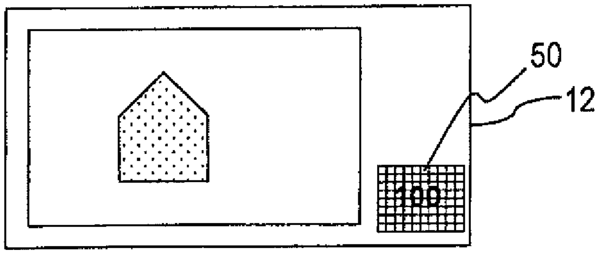

A digital image captured by the sensor 32 is hence composed of pixels 50 arranged in a rectangular matrix and is described by the pixel data. The illustration of the image of a value document 12 in FIG. 3 shows for clarity's sake only some of the pixels 50, which are moreover shown greatly enlarged. In the embodiment the resolution of the sensor 32 is at least so great that a pixel corresponds to an area of no more than 0.3 mm×0.3 mm on the value document. Each of the pixels has associated therewith as pixel data, besides a number or numeral i rendering the position in the image, color values $r_i$, $g_i$, $b_i$ for red, green and blue. In this embodiment there is employed a sensor 32 that represents the stated pixel data as a vector in a three-dimensional, device-independent color space, here the CIE Lab color space.

Figure 4:
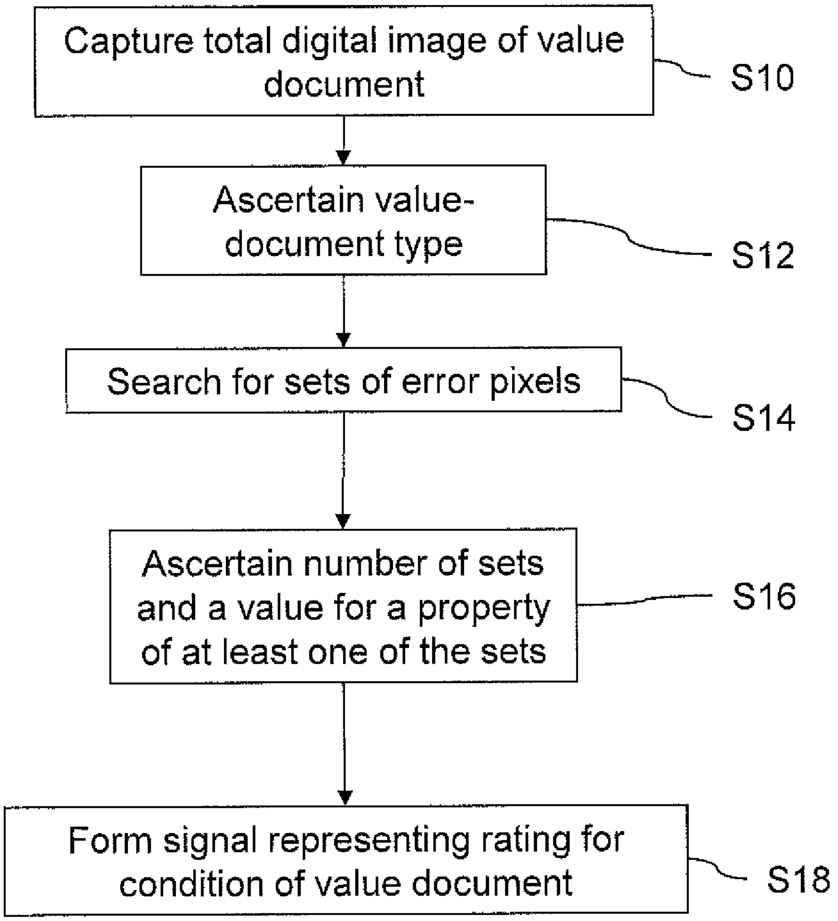

For checking the value documents there is stored in the memory 40 in a portion serving as part of the evaluation device 34, and thus in this example in the control device 30, a program with program code which, upon execution through the evaluation device 34, i.e. here the processor 38, carries out the steps of a method for examining the optical condition of value documents, which are illustrated schematically in FIG. 4.

First, in step S10 there is captured by the evaluation device 34 or the processor 34 by means of the optical sensor 32 a digital image of a value document, which comprises pixels.

The evaluation device 34 then, in step S12, ascertains from the digital image the type of the value document, in the case of bank notes for example the denomination or face value and currency, and the position and orientation of the value document, for example front or back of the bank note and upright orientation or not, and stores corresponding values.

In step S14 the evaluation device 34 then searches in the pixels of the digital image for sets of error pixels, which are respectively given in that the error pixels fulfill a specified deviation criterion for an impermissible deviation of at least one specified pixel property, and the distance of each error pixel of the respective set from at least one other error pixel of the same set does not exceed a specified distance that is greater than the distance of directly neighboring pixels of the digital image, and that are not associated with any other set.

The evaluation device 34 then, in step S14, ascertains a number of sets found during the search and at least one value for at least one property of at least one of the sets found during the search and stores corresponding values.

In step S18 the evaluation device 34 forms, in dependence on the ascertained number and the at least one value for the property of at least one of the sets found during the search, a signal representing a rating for the optical condition of the value document, and stores a corresponding condition value for the optical condition.

The evaluation device 34 then ascertains according to a specified criterion for the overall condition, in dependence on the signal or the stored condition value and the signal of the ultrasonic sensor 33, a value for an overall condition of the value document, which it makes available for controlling the transport device 20.

Figure 5:
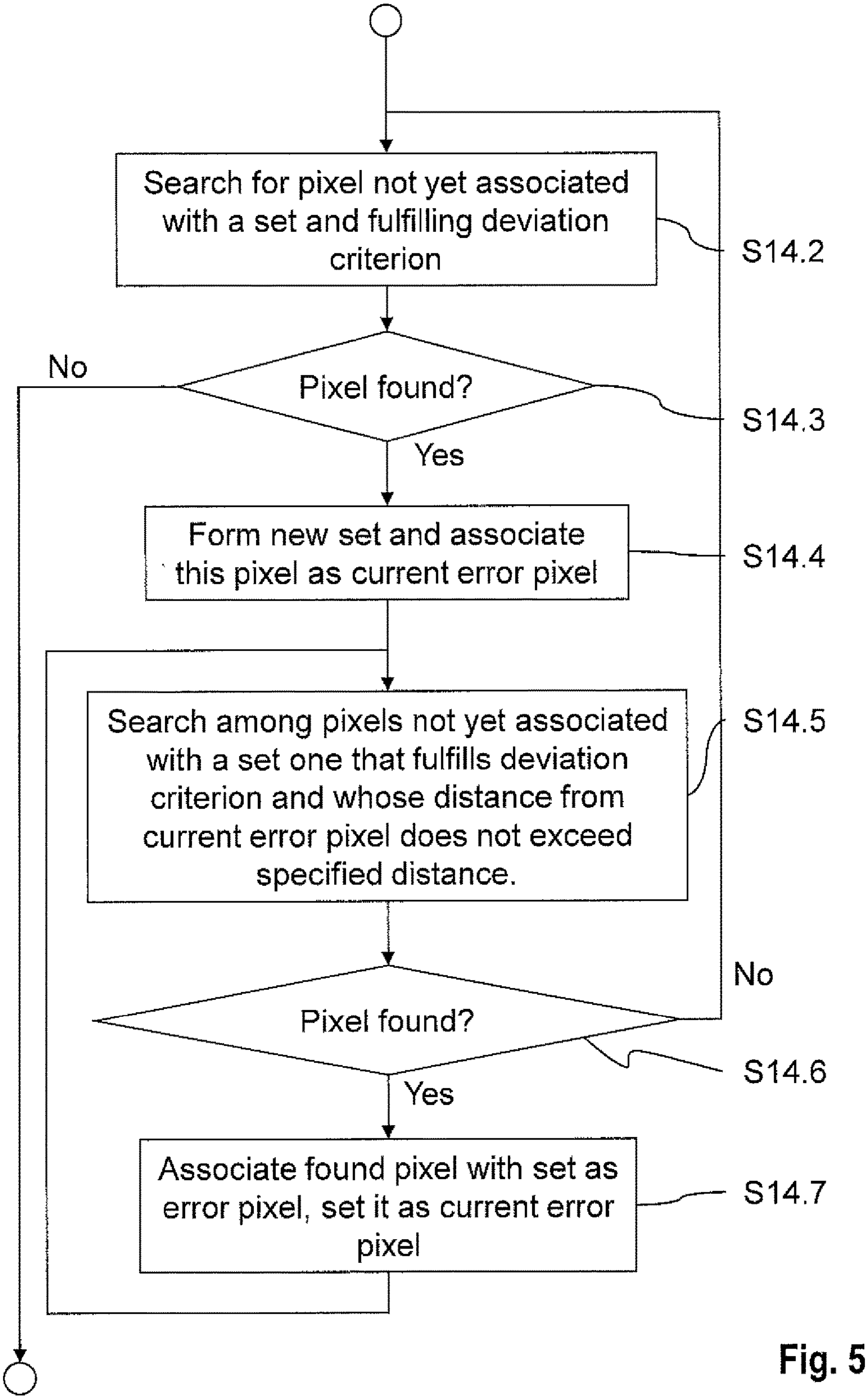

FIG. 5 shows more precisely the substeps of the step 14 in this embodiment.

When carrying out the step 14 the evaluation device 34 checks, inter alia, whether a pixel fulfills the specified deviation criterion. In the present embodiment it ascertains for this purpose from the value-document type determined in step S12 the position of the captured digital image relative to a reference image, specified for said type, for the value document's position and orientation ascertained in step S12. The reference image has the same resolution or pixel number as the digital image, and the pixel data for the pixels of the reference image comprise coordinates in the color space of the digital image. On the basis of the relative position of the digital image and the reference image, the evaluation device 34 can associate pixels of the digital image with corresponding pixels of the reference image.

Each pixel of the reference image has a color reference distribution associated therewith in the employed color space. The evaluation device can now check as a deviation criterion pixel by pixel, i.e. for mutually associated pixels of the two images, whether the pixel data lie outside the color reference distribution. If this is the case, the deviation criterion is deemed fulfilled, otherwise it is not. The color reference distribution can be given in particular by a region of the color space that is enclosed by a reference area. In particular, there can be employed for ascertaining the deviation or for checking the deviation criterion a method as is described in WO 2008/058742 A1, whose total content is hereby incorporated in the description by reference. When a pixel is recognized whose pixel data fulfill the deviation criterion, it is marked by storing at least a corresponding indicator.

Further, the evaluation device 34 checks whether the distance between a pixel and an error pixel does not exceed a specified distance. In this check the unit of length employed is the length of the sides of the cells of the square grid formed by the pixels. The distance employed is the distance of the centers or geometric centroids of the cells or pixels of the square grid whose distance is to be ascertained. The specified distance employed in the present embodiment is a distance of 5 units.

First, the evaluation device 34 searches in step S14.2 among the pixels of the digital image for a pixel that fulfills the specified deviation criterion but is not yet associated with a set of error pixels In step S14.3 it is checked whether such a pixel has been found. If the evaluation device 34 has not found one, the step S14 is terminated.

Otherwise, the evaluation device 34 forms in step S14.4 a new set with which it associates the found pixel as the current error pixel, i.e. the one last associated with the set. For associating pixels, there is associated with the pixel a number that identifies the found sets.

In step S14.5 the evaluation device 34 then searches among those pixels of the digital image that are not yet associated with a set, including the set last formed, a pixel that fulfills the deviation criterion and whose distance from the current error pixel, i.e. the one last associated with the set, does not exceed the specified distance.

Figure 6:
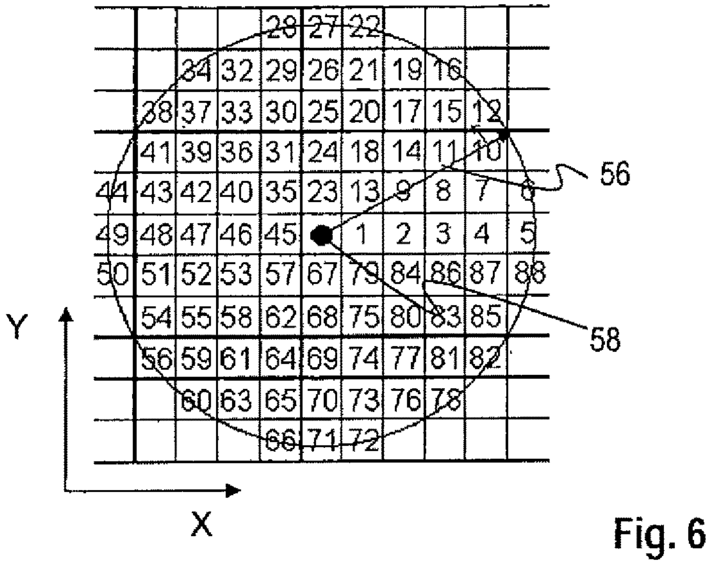
Figure 7:
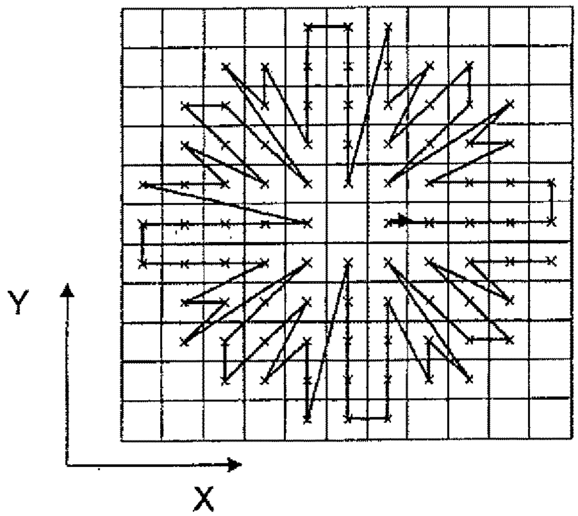

In the present embodiment there is employed for this purpose the following procedure, which is illustrated in FIGS. 6 and 7.

So that a systematic and fast search can be done for pixels whose distance from the current error pixel does not exceed the specified distance, there is employed in this embodiment a search list of pixels which is determined by the current error pixel, i.e. the one last associated with the set, and a specified list or order of pixels to be examined.

The specified list is obtained in the present example by searching iteratively on a path 56 from the error pixel 58 last associated with the set having the length of the specified distance in a given search direction starting out from the pixel nearest to the last associated error pixel on the path for further pixels on the path with increasing distances and, if no pixels are found, the search direction and the path in a specified search direction are rotated until a pixel lies on the rotated path and the search direction is chosen as the new given search direction. The procedure is illustrated in FIG. 6 and FIG. 7. In the present example, a pixel is deemed as lying on the path when a specified reference point of the pixel lies on the path. In so doing, there is created an ordered list of relative coordinates which represents the coordinates of the respectively found pixel relative to the error pixel, in the order of finding. For better illustrating the order, there is respectively associated with the relative coordinates, in this example, a natural number that represents the position in the list or order. In the example this is the center or geometric centroid of the pixel. Starting out from an error pixel last associated with the set in the middle of the shown detail, a search is first done along a path starting out from the error pixel, whose length is the specified distance, in the example the length 5, and in an arbitrary specified direction, in the example in the direction of a line of the pixel arrangement of the image, i.e. the x axis, for pixels that lie on the path and whose distance from the error pixel last associated with the set does not exceed the specified distance. Thus, a search is done for pixels in increasing distances from the error pixel last found. In FIG. 6 these are the pixels with the numbers 1 to 6. The found pixels or their relative coordinates and the numbers associated therewith are added to the list. If no further pixels are found on the path in the current position or direction, the following substeps are iteratively carried out, or repeated, until all pixels in a disk with the radius of the specified distance around the reference point of the error pixel last associated with the set have been found, or the direction of the path lies in the specified direction again after further rotation. In a first substep the path is rotated in a specified rotation direction, in the example in the counter-clockwise direction, until at least one further pixel lies on the path for the first time, its relative coordinates being added to the list with a corresponding number. If at least two pixels lie on the path after the rotation, that pixel is first added to the list that is nearest to the error pixel last associated with the set. In a second substep, further pixels are then searched for on the path in the direction of increasing distances from the error pixel last associated with the set. If any are found, they or their relative coordinates and a number corresponding to the order of finding are added to the list. If no further pixels are found on the path in the current position or direction, the first substep is carried out again. The thus found list is stored in the memory of the evaluation device in order to be employed in the method. In FIG. 6 the order of the pixels for a specified distance of 5 on a square grid is represented by numbers stated in the pixels, FIG. 6 shows the corresponding value.

The search list of pixels to be searched results from the stored list by the coordinates of the error pixel last associated with the set being respectively added to the relative coordinates of the stored list. The pixels of the search list, i.e. the pixels whose coordinates are contained in this search list, have by design a distance from the error pixel last associated with the set that does not exceed the specified distance.

In step 14.5 the pixels are hence searched in the order of the list or the search list while employing the stored list. The search list does not necessarily have to be created previously here; it suffices that the coordinates of the pixel to be examined next are only ascertained when the check of the current pixel is completed.

The pixels of the search list are thus examined in the order of the search list as to whether they fulfill the deviation criterion and whether the pixel has not yet been associated with a set.

If in step S14.6 such a pixel is found, in step S14.7 it is associated with the set as an error pixel and set as the error pixel last associated with the set, i.e. as the current error pixel.

Otherwise, the evaluation device continues the method with step S14.2.

In this way there are found, through execution of the described method, sets of error pixels whose error pixels have a distance from at least one respective other error pixel of the set that does not exceed the specified distance, and that fulfill the deviation criterion.

After termination of the step S14 the evaluation device ascertains in step S16 the number of sets found in step S14 and a value for at least one specified property of at least one of the sets, in the example a value for two specified properties of all found sets.

In the example, for each of the found sets there is ascertained the number of error pixels and thus a measure of the area with color deviations in accordance with the deviation criterion. Further, there is formed for each of the sets the quotient of the length of the edge of the domain formed by error pixels, or of the domains formed by the error pixels, and the number of error pixels. For ascertaining the edge, edge error pixels are searched for, i.e. error pixels having at least one nearest neighboring pixel that is not an error pixel. For each edge error pixel, two nearest neighboring edge error pixels are then ascertained, and a line is respectively drawn between the edge error pixel and the two nearest neighboring edge error pixels. The length of the edge results from the sum of the lines for a set.

In dependence on the number and the values, the evaluation device in step S18 forms a signal and stores a condition value that characterize the condition of the value document. The condition value is computed in particular as a function of the number of sets, the number of pixels of the sets, and the ascertained quotients. For example, a condition value for a good condition permitting further use or further circulation is ascertained when the greatest number of pixels of the sets is smaller than a specified first threshold value, or the greatest number of pixels of the sets is greater than the first, and smaller than a specified second, threshold value, and the quotient for the set is greater than a third, and smaller than a fourth, threshold value.

Figure 8A:
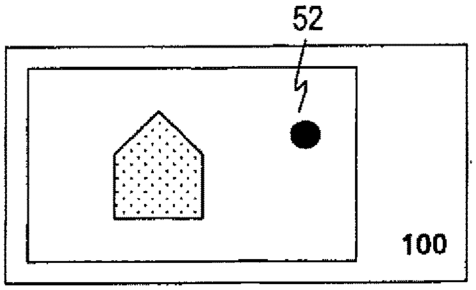
Figure 8B:
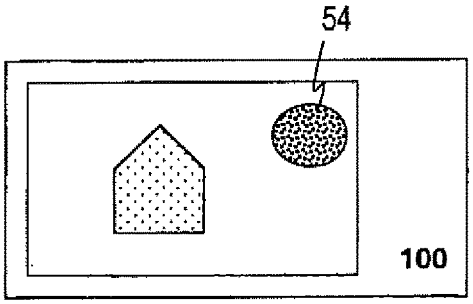

This is illustrated in FIGS. 8*a* and 8*b*. These show the appearance of two value documents of the same type with different soilings. A spot 52 on a value document in FIG. 8*a* possesses, measured in number of pixels, the same area as the speckled spot 54 on the value document of the same type in FIG. 8*b*. If the condition were determined employing only the largest set of error pixels that are directly neighboring, and a threshold criterion for the maximum number of error pixels of the set, the value document in FIG. 8*a* would be unfit for circulation, depending on the threshold value, but that in FIG. 8*b* would be fit for circulation because only small spots were recognized therein. In the present example, however, with consideration of the quotient a more differentiated statement is possible, when the threshold values are chosen accordingly.

Figure 9:
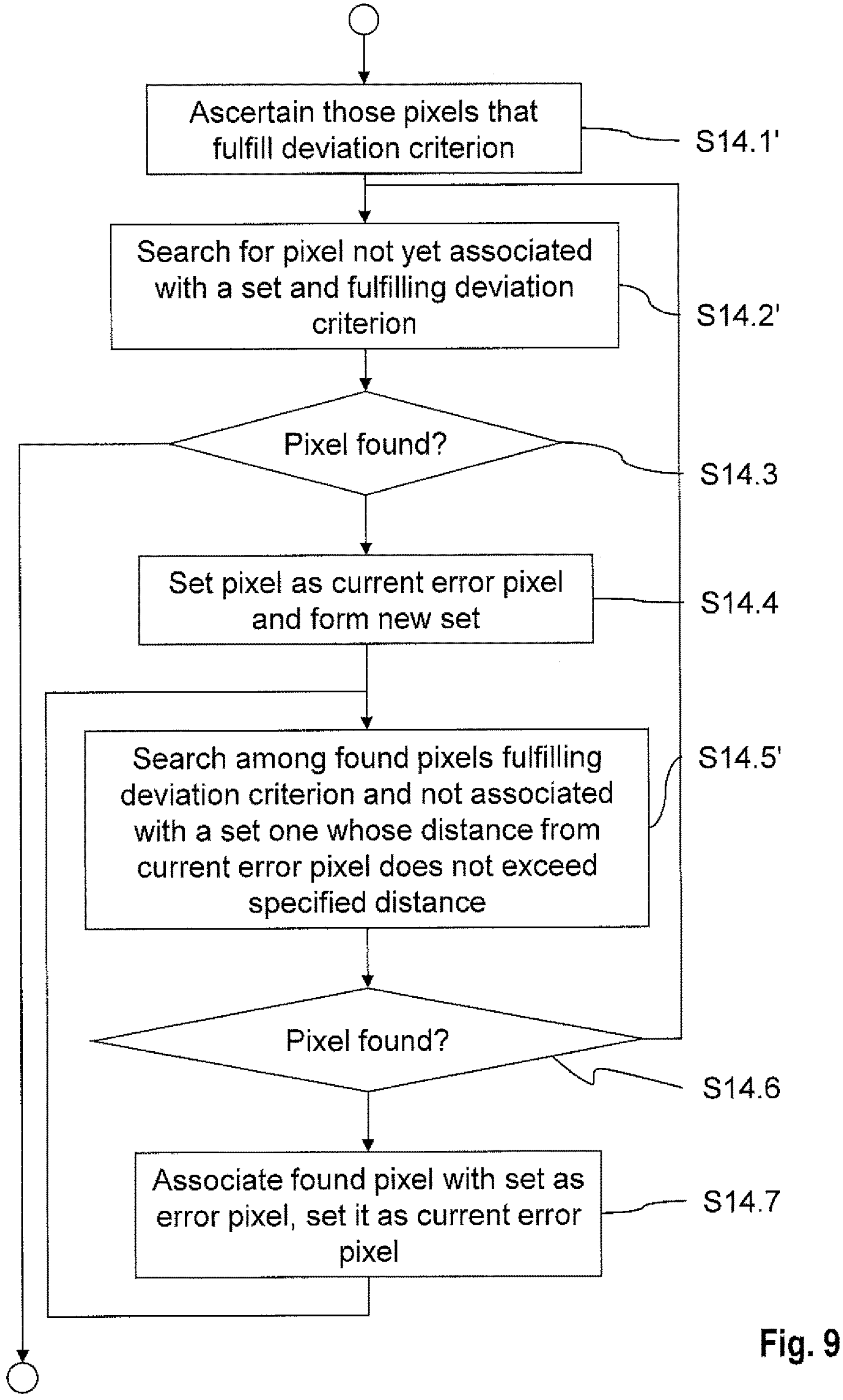

A second embodiment differs from this embodiment only in that the step S14 illustrated in FIG. 4 is replaced by a step S14' illustrated in FIG. 9.

The step S14' in turn differs from the step S14 only in that, firstly, the ascertainment of the pixels meeting the deviation criterion is carried out in a step S14.1' at the beginning of the step S14' and, as a result thereof, the step S14.2 is replaced by the step S14.2', and the step S14.5 by the step S14.5'.

The other steps are unchanged, so that reference can be made to the statements thereon in the first embodiment. The evaluation device of the second embodiment is modified accordingly relative to the evaluation device of the first embodiment, but the apparatus including the evaluation device is otherwise unchanged.

In step S14.1' it is checked systematically for each pixel of the digital image whether it fulfills the deviation criterion mentioned in the first embodiment. If this is the case, there is added to the pixel data for the pixel an indicator indicating that the pixel fulfills the deviation criterion.

As a result thereof, the step S14.2' differs from the step S14.2 only in that during the search for a pixel not yet associated with a set and fulfilling the deviation criterion the criterion itself no longer needs to be checked, it only being checked during the search for the pixel whether its pixel data contain the indicator.

Analogously, the step S14.5' differs from the step S14.5 in that during the search for pixels not yet associated with a set and fulfilling the deviation criterion and whose distance from the current error pixel does not exceed the specified distance, the fulfillment of the deviation criterion is checked by only checking whether the pixel data contain the indicator.

A third and a fourth embodiment differ from the first and second embodiments only in that during the search for sets of error pixels, there are first searched for groups of error pixels whose error pixels are directly neighboring to at least one other error pixel; in the present example of an arrangement of rectangular pixels forming a square grid, this means that each error pixel borders on at least one other error pixel of the set. The other steps are unchanged, so that the statements thereon in the first embodiment apply here too. The evaluation device is then modified in accordance with the evaluation device in the first and second embodiments, the apparatus including the evaluation device respectively otherwise unchanged.

Figure 10A:
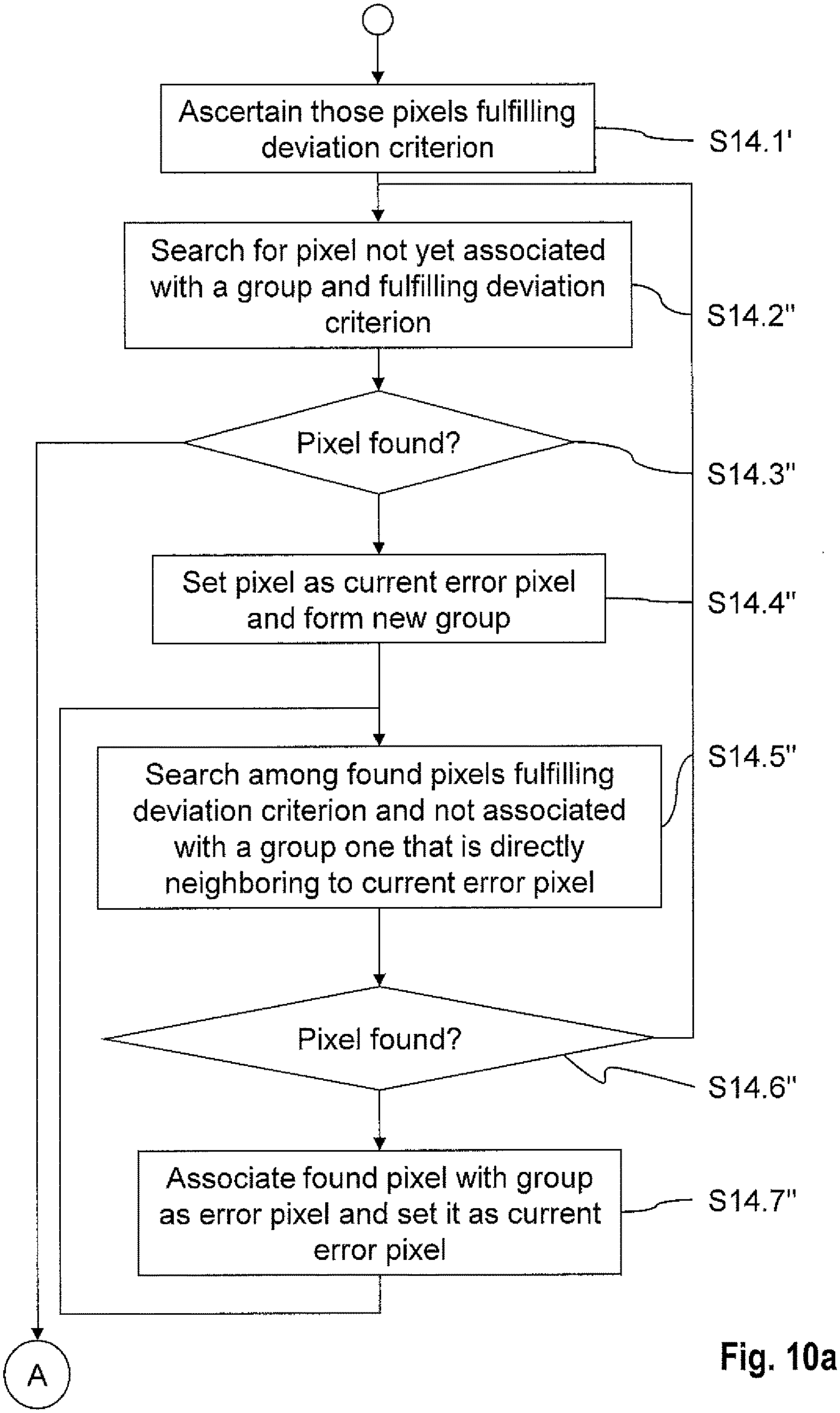
Figure 10B:
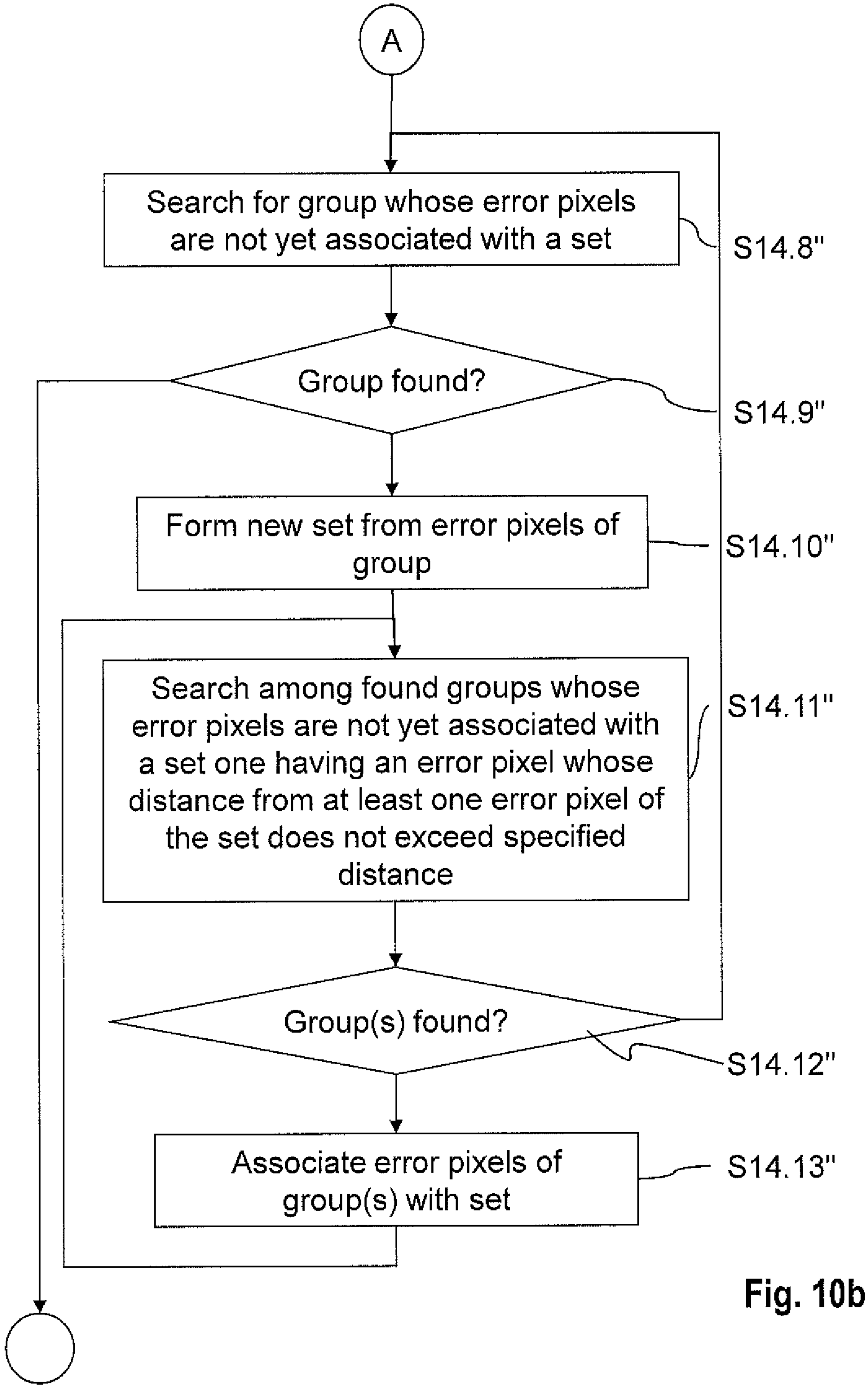

Concretely, the step S14' is replaced in the fourth embodiment by the step S14", which is illustrated in FIGS. 10*a* and 10*b*.

First, the evaluation device carries out the step S14.1' as in the second embodiment.

The evaluation device then executes the steps S14.2" to S14.4", which are executed like the steps S14.2', S14.3 and S14.4 except that groups are formed instead of sets. However, in step S14.3" in the case that no further pixel can be found, the step S14 is not terminated, but continued with step S14.8".

The step S14.5" differs from the step S14.5' only in that the evaluation device only searches for pixels fulfilling the deviation criterion that are not yet associated with a group instead of a set, on the one hand, and are directly neighboring to the current error pixel, i.e. have a common side therewith, on the other hand.

The steps S14.6" and S14.7" differ from the steps S14.6 and S14.7 only in that the evaluation device carries out an association with a group instead of a set or jumps to step S14.2" or step S14.5".

If no further pixel is found in step S14.3", the evaluation device forms sets of error pixels from the found groups in the following substeps of the step S14".

First, it searches in step S14.8" for a group whose error pixels are not yet associated with a set of error pixels, as it is determined in the second embodiment, i.e. error pixels that fulfill the deviation criterion, are not associated with any other set, and whose distance from at least one other error pixel of the same set does not exceed the specified distance.

If the evaluation device finds no such group (any more) in step S14.9", it terminates the step S14".

Otherwise, in step S14.10" it forms a new set from the error pixels of the group analogously to step S14.4.

In the following loop the evaluation device first, in step S14.11", searches among the found groups whose error pixels are not yet associated with a set for one having an error pixel whose distance from at least one error pixel of the set does not exceed the specified distance.

If the evaluation device ascertains in step S14.12" that no group was found, it jumps back to step S14.8".

Otherwise, it associates the error pixels of the found groups with the set in step S14.13".

In step S14.11" it can suffice to check, during the search for the group, only whether among the edge pixels thereof, i.e. error pixels having at least one neighboring pixel that is not an error pixel, one has a distance from an edge pixel of the current set that does not exceed the specified distance.

A fifth embodiment differs from the first embodiment in that another deviation criterion is employed, all steps and devices otherwise being unchanged, so that the descriptions thereon apply here too unchanged.

The deviation criterion in this embodiment additionally depends on the distance of the pixel from the error pixel last associated with the set.

In the example, the region enclosed by the reference area can for this purpose be reduced, i.e. scaled with a scaling factor smaller than 1, with increasing distance, while its position in the color space remains unchanged.

For example, the scaling factor, beginning with a value 1 at a distance 1, can drop linearly to a value 0.75 at a distance of 5.

The check of whether a pixel lies in the reference distribution then employs the region scaled with the scaling factor that is associated with the distance of the pixel from the error pixel last associated with the set.

This procedure has the advantage that irregular spots, for example coffee spots, on a value document are recognized more easily than a large spot. In a conventional method, two small spots might be recognized instead of a larger spot.

The invention claimed is:

1. A method for examining the optical condition of a value document on the basis of a digital image of at least a specified region of the value document, the digital image comprising pixels, said method comprising the steps:

searching pixels of the digital image for sets of error pixels, wherein the error pixels fulfill a specified deviation criterion for an impermissible deviation of at least one specified pixel property in order to determine pixels that lie outside a reference distribution for permissible pixel properties, and a distance of each error pixel of the respective set from at least one other error pixel of the same set is smaller or equal to a specified distance that is greater than the distance of directly neighboring pixels of the digital image, and ascertaining a number of sets found during the search and/or a value for at least one property of at least one of the sets found during the search.

2. The method according to claim 1, wherein for searching for a set of error pixels, error pixels are associated with the set such that for an error pixel already associated with the set there is searched for a nearest error pixel that fulfills the deviation criterion and is not yet associated with the set and whose distance from the already associated pixel does not exceed the specified distance, and if the nearest error pixel is found, the nearest error pixel is associated with the set.

3. The method according to claim 2, wherein during the search for a set, the search for the nearest error pixel and its associating are executed repeatedly, there being respectively employed as the error pixel already associated with the set the error pixel last associated with the set.

4. The method according to claim 3, wherein for searching for the nearest error pixel, there is respectively searched for an error pixel in a search list of pixels which is determined at least by the error pixel last associated with the set and the specified distance or by the error pixel last associated with the set and a specified list.

5. The method according to claim 2, wherein for searching for the nearest error pixel, until an error pixel is found, pixels are checked in an order that is obtainable by searching iteratively on a path from the last associated error pixel having the length of the specified distance in a given search direction starting out from the pixel nearest to the last associated error pixel on the straight line for further pixels on the straight line with increasing distances, and if no pixels are found, the search direction and the straight line are rotated in a specified search direction until a pixel lies on the rotated straight line and the search direction is chosen as the new given search direction.

6. The method according to claim 1, wherein during the search for the sets, the pixels fulfilling the deviation criterion are first ascertained and thereafter the sets of error pixels are searched for only in said pixels.

7. The method according to claim 1, wherein during the search for the sets, starting out from an error pixel of a set, pixels whose distance from the error pixel does not exceed the specified distance are examined as to whether they fulfill the deviation criterion.

8. The method according to claim 7, wherein the deviation criterion depends on the distance between the error pixel and the checked pixel.

9. The method according to claim 1, wherein for searching for a set of error pixels, there are first searched for groups of error pixels that respectively comprise error pixels that fulfill the deviation criterion and that are directly neighboring, wherein it is checked whether the distance of at least one error pixel of one of the groups from at least one error pixel of another of the groups whose error pixels are not yet associated with a set does not exceed the specified distance and, if this is the case, the error pixels of the two groups are associated with the same set.

10. The method according to claim 1, wherein the number and/or the value is employed for ascertaining a value representing the optical condition.

11. The method according to claim 1, wherein there is employed as a property of the set a function of the number of error pixels of the set and of the length of a line through the error pixels of the set which form the edge thereof.

12. A method for examining the optical condition of a value document comprising the steps:

capturing a first digital image of at least a specified region of the value document wherein, the first digital image comprises pixels, and carrying out the method according to claim 1 with the first digital image.

13. An evaluation device configured to examine the optical condition of a value document on the basis of a digital image of at least a specified region of the value document, the digital image comprising pixels, wherein the evaluation apparatus has an interface for receiving a digital image of at least a specified region of the value document and is configured to carry out a method according to claim 1 on the basis of the digital image of at least a specified region of the value document that is received by the interface.

14. An apparatus for examining the optical condition of a value document, comprising:

an optical sensor configured to capture a digital image of at least a region of the value document, and an evaluation device according to claim 13 whose interface is connected to the sensor via a signal connection, so that a digital image captured by the sensor is receivable by the evaluation device.

15. A non-transitory computer-readable data carrier comprising program code which when executed by a processor of a computer, the computer executes a method according to claim 1.

16. A method for examining the optical condition of a value document on the basis of a digital image of at least a specified region of the value document, the digital image comprising pixels, said method comprising the steps:

searching pixels of the digital image for sets of error pixels, wherein the error pixels fulfill a specified deviation criterion for an impermissible deviation of at least one specified pixel property, and a distance of each error pixel of the respective set from at least one other error pixel of the same set does not exceed a specified distance that is greater than the distance of directly neighboring pixels of the digital image, and ascertaining a number of sets found during the search and/or a value for at least one property of at least one of the sets found during the search, wherein for searching for a set of error pixels, error pixels are associated with the set such that for an error pixel already associated with the set there is searched for a nearest error pixel that fulfills the deviation criterion and is not yet associated with the set and whose distance from the already associated pixel does not exceed the specified distance, and if the nearest error pixel is found, the nearest error pixel is associated with the set, wherein during the search for a set, the search for the nearest error pixel and its associating are executed repeatedly, there being respectively employed as the error pixel already associated with the set the error pixel last associated with the set, and wherein for searching for the nearest error pixel, there is respectively searched for an error pixel in a search list of pixels which is determined at least by the error pixel last associated with the set and the specified distance or by the error pixel last associated with the set and a specified list.

17. A method for examining the optical condition of a value document on the basis of a digital image of at least a specified region of the value document, the digital image comprising pixels, said method comprising the steps:

searching pixels of the digital image for sets of error pixels, wherein the error pixels fulfill a specified deviation criterion for an impermissible deviation of at least one specified pixel property, and a distance of each error pixel of the respective set from at least one other error pixel of the same set does not exceed a specified distance that is greater than the distance of directly neighboring pixels of the digital image, and ascertaining a number of sets found during the search and/or a value for at least one property of at least one of the sets found during the search, wherein for searching for a set of error pixels, error pixels are associated with the set such that for an error pixel already associated with the set there is searched for a nearest error pixel that fulfills the deviation criterion and is not yet associated with the set and whose distance from the already associated pixel does not exceed the specified distance, and if the nearest error pixel is found, the nearest error pixel is associated with the set, wherein during the search for a set, the search for the nearest error pixel and its associating are executed repeatedly, there being respectively employed as the error pixel already associated with the set the error pixel last associated with the set, wherein for searching for the nearest error pixel, there is respectively searched for an error pixel in a search list of pixels which is determined at least by the error pixel last associated with the set and the specified distance or by the error pixel last associated with the set and a specified list, and wherein for searching for the nearest error pixel, until an error pixel is found, pixels are checked in an order that is obtainable by searching iteratively on a path from the last associated error pixel having the length of the specified distance in a given search direction starting out from the pixel nearest to the last associated error pixel on the straight line for further pixels on the straight line with increasing distances, and if no pixels are found, the search direction and the straight line are rotated in a specified search direction until a pixel lies on the rotated straight line and the search direction is chosen as the new given search direction.

* * * * *